G. M. PORTER.
BIRD CAGE AND THE LIKE.
APPLICATION FILED SEPT. 21, 1908.
936,032.
Patented Oct. 5, 1909.
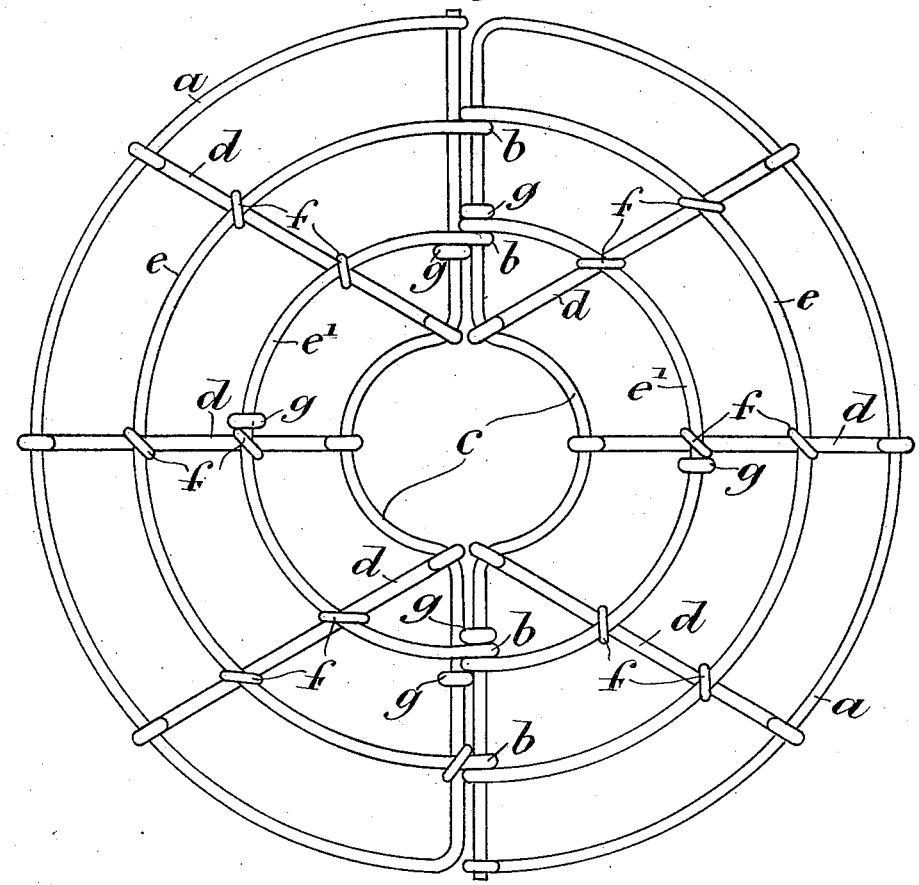
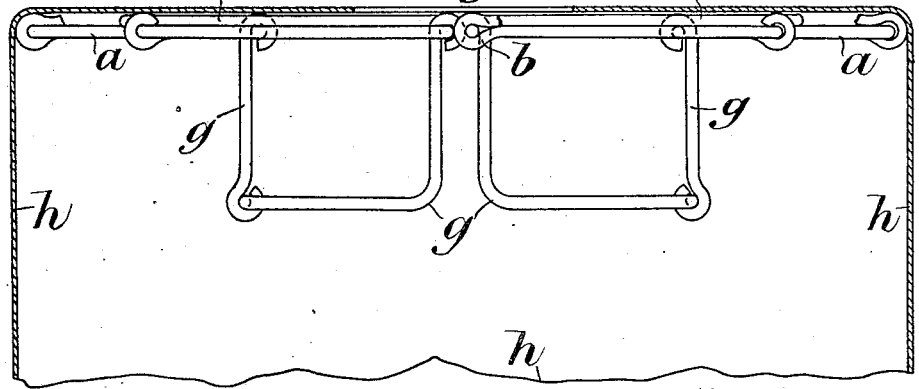

UNITED STATES PATENT OFFICE.

GERALD MONTGOMERY PORTER, OF TUNBRIDGE WELLS, ENGLAND.

BIRD-CAGE AND THE LIKE.

936,032.     Specification of Letters Patent.     Patented Oct. 5, 1909.

Application filed September 21, 1908. Serial No. 454,062.

*To all whom it may concern:*

Be it known that I, GERALD MONTGOMERY PORTER, a subject of the King of Great Britain, residing at 112 Upper Grosvenor road, Tunbridge Wells, Kent, England, have invented a new and useful Improvement Relating to Bird-Cages and the Like, of which the following is a specification.

This invention has reference to an improvement relating to bird cages and the like, and it has more particular application to such cages as are employed by bird fanciers for housing parrots.

It is well known that all parrots, and more especially the African grays are very susceptible to draft and cold, and great difficulty is experienced in keeping them properly protected and warm during the colder parts of the year as well as at night.

Hitherto it has been practically impossible to keep birds of the class above referred to snugly covered up owing to their mischievous habits and the destruction they wreak on all things within their reach, whereby it has only been possible to employ some old or otherwise useless covering material for their cages.

The object of my invention is to provide a simple, cheap, and compact device which, in use, is adapted to support and surround, as well as cover in, bird cages and the like in such manner, that the covering material is held away from the said cage out of the reach of the occupant.

To this end the invention consists essentially of a skeleton frame of wire provided at its underside with supports for engaging the roof or upper part of a bird cage or the like, and a covering of suitable material adapted to be suspended therefrom.

In order that my invention may be the better understood and carried into practical effect I will now proceed to describe the same with reference to the accompanying drawing; Figure 1 being a plan of the improved device with the covering material removed, and Fig. 2 an elevation of the same showing the aforesaid covering material broken away or in section for the sake of clearness.

According to the drawing *a* is a circular frame of galvanized wire of a diameter sufficiently large to project slightly beyond or over the circumferential edge of the cage to which it is to be applied. This frame *a* is hinged together in two equal parts at *b, b,* and is provided at its center with an aperture or opening *c*, which is adapted in use to fit over, the ordinary bell or hook fitted to the top of parrot cages and the like, for purposes of suspension or carriage. The frame *a* is also furnished with approximately radially situated stiffening wires or pieces *d, d,* and concentrically arranged wires *e, e'* all of which are conveniently bound rigidly together by wire straps *f, f;* or the several parts may be brazed or soldered together as will be readily understood.

*g, g,* are supports or feet attached at the underside of one of the concentrically arranged wires *e'*, and by means of which the frame *a* supported upon the top of a parrot cage—not shown. These supports *g, g,* preferably consist of bent wire, as shown, arranged in plan to register beneath the aforesaid wire *e'*, and *h* is a covering or "cozy" of suitable material, such as thick flannel or cloth, which is suspended from the frame *a*, its purpose and application being readily comprehended from the foregoing description without further explanation.

Obviously the shape in plan of the frame *a* may be otherwise than circular, for example, when the device is to be applied to square or rectangularly shaped cages its contour will be correspondingly fashioned.

Furthermore the supports *g, g,* may consist of wire loops provided at their lower parts with bent in or notched portions for fitting over a single wire or wires, and I wish it understood that the foregoing embodiment of my invention is by way of example only as the details of construction as well as the materials employed can be considerably varied without in any way departing from the nature or spirit of the said invention.

From the foregoing it will be seen that by my invention a very simple and effective means is provided for the purpose specified which will completely baffle the destructive propensities of parrots and such like birds, while its being hinged together in two parts, or more if desired, renders the device compact and easy to pack away when not in use, and its application to other purposes will be self evident without further exemplification.

I claim:—

1. The skeleton frame for bird cage screens, composed of two diametrically hinged semi-circular parts and provided at its underside with supports adapted to rest on the cage, substantially as set forth.

2. The screen for bird cages comprising a frame made of two parts hinged together diametrically and having a central aperture, diverging stiffening wires, concentrically disposed connecting wires, wire straps connecting the diverging and concentric wires, supports for the screen and a covering, all substantially as shown and for the purpose specified.

GERALD MONTGOMERY PORTER.

Witnesses:
A. NUTTING,
FREDK. SADLER.